United States Patent
Kato et al.

(10) Patent No.: US 10,400,886 B2
(45) Date of Patent: Sep. 3, 2019

(54) CONTROL DEVICE AND CONTROL METHOD FOR CONTINUOUSLY VARIABLE TRANSMISSION

(71) Applicant: AISIN AW CO., LTD., Anjo-shi, Aichi-ken (JP)

(72) Inventors: Masachika Kato, Anjo (JP); Akihiro Kikkawa, Anjo (JP); Kiyoshi Kurita, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 149 days.

(21) Appl. No.: 15/546,220

(22) PCT Filed: Mar. 14, 2016

(86) PCT No.: PCT/JP2016/057924
§ 371 (c)(1),
(2) Date: Jul. 25, 2017

(87) PCT Pub. No.: WO2016/158340
PCT Pub. Date: Oct. 6, 2016

(65) Prior Publication Data
US 2018/0045301 A1    Feb. 15, 2018

(30) Foreign Application Priority Data
Mar. 27, 2015  (JP) .................. 2015-066391

(51) Int. Cl.
*F16H 61/66*  (2006.01)
*F16H 59/54*  (2006.01)
(Continued)

(52) U.S. Cl.
CPC ............ *F16H 59/54* (2013.01); *F16H 61/02* (2013.01); *F16H 61/0248* (2013.01);
(Continued)

(58) Field of Classification Search
CPC .................... F16H 61/66; F16H 2061/6604
See application file for complete search history.

(56) References Cited

U.S. PATENT DOCUMENTS 5,722,500 A    3/1998  Toukura et al.
8,694,215 B2   4/2014  Kawasumi et al.
(Continued)

FOREIGN PATENT DOCUMENTS

JP    H07-224913 A      8/1995
JP      09296860 A  *  11/1997  ............ F16H 61/66
(Continued)

OTHER PUBLICATIONS

Jun. 7, 2016 Search Report issued in International Patent Application No. PCT/JP2016/057924.
(Continued)

*Primary Examiner* — Tisha D Lewis
(74) *Attorney, Agent, or Firm* — Oliff PLC

(57) ABSTRACT

A speed change ECU for a CVT sets a target input rotational speed Nin* such that the speed ratio of the CVT is varied stepwise a plurality of times consecutively to the downshift side in response to an operation to depress a brake pedal by a driver, and sets the target input rotational speed Nin* such that an amount of increase S(1), S(2), . . . in input rotational speed along with a downshift becomes smaller as the number of times of execution of downshifts is increased while downshifts in which the speed ratio is varied stepwise are executed consecutively.

20 Claims, 8 Drawing Sheets

(51) Int. Cl.
*F16H 61/02* (2006.01)
*F16H 61/21* (2006.01)
*F16H 61/662* (2006.01)

(52) U.S. Cl.
CPC ............ *F16H 61/21* (2013.01); *F16H 61/66* (2013.01); *F16H 61/662* (2013.01); *F16H 61/0213* (2013.01)

(56) References Cited

U.S. PATENT DOCUMENTS

| | | | |
|---|---|---|---|
| 2008/0234904 A1 | 9/2008 | Tawara et al. | |
| 2009/0240405 A1* | 9/2009 | Tawara | B60W 10/02 701/52 |
| 2015/0166048 A1* | 6/2015 | Herrmann | B60K 6/445 701/22 |
| 2018/0045301 A1 | 2/2018 | Kato et al. | |

FOREIGN PATENT DOCUMENTS

| | | | |
|---|---|---|---|
| JP | 2005-113985 A | 4/2005 | |
| JP | 2005-233378 A | 9/2005 | |
| JP | 2007-078167 A | 3/2007 | |
| JP | 2013-200003 A | 10/2013 | |
| JP | 2014-088907 A | 5/2014 | |
| JP | 2014-134212 A | 7/2014 | |
| JP | 2014214824 A * | 11/2014 | ............ F16H 61/66 |
| JP | 2016-035317 A | 3/2016 | |
| WO | 2015/146464 A1 | 10/2015 | |

OTHER PUBLICATIONS

Jun. 14, 2016 International Search Report issued in Patent Application No. PCT/JP2016/058058.
Feb. 7, 2019 Office Action issued in U.S. Appl. No. 15/546,199.
U.S. Appl. No. 15/546,199, filed Jul. 25, 2017 in the name of Kato et al.

* cited by examiner

CONTROL DEVICE AND CONTROL METHOD FOR CONTINUOUSLY VARIABLE TRANSMISSION

TECHNICAL FIELD

The present disclosure relates to a control device and a control method for a continuously variable transmission mounted on a vehicle.

BACKGROUND ART

There has hitherto been known a control device for a continuously variable transmission connected to the output side of an engine. The control device controls the continuously variable transmission such that the output rotational speed of the engine is brought to a target rotational speed (see Patent Document 1, for example). In the case where deceleration which is determined by deceleration determination means which determines deceleration is large, the control device increases the target rotational speed stepwise, thereafter increases the target rotational speed at a predetermined gradient, and further decreases the target rotational speed at a predetermined lowering gradient which is based on the required deceleration. Consequently, it is possible for the engine to generate a braking force (engine brake force) by increasing the speed ratio, which is continuously variable, in the case where deceleration is large.

RELATED-ART DOCUMENTS

Patent Documents

[Patent Document 1] Japanese Patent Application Publication No. 2005-113985 (JP 2005-113985 A)

SUMMARY

The technology described in Patent Document 1 is intended to execute engine brake control during abrupt deceleration in a vehicle on which a continuously variable transmission is mounted without forcing a driver to perform a manual operation, and not to provide a deceleration feel that matches the driver's intention to decelerate. Thus, the control device for a continuously variable transmission according to the related art still has room for improvement in terms of improving the deceleration feel and the drivability, during braking, of a vehicle on which the continuously variable transmission is mounted.

In view of the foregoing, it is a main object of preferred embodiments according to the present disclosure to improve the deceleration feel and the drivability, during braking, of a vehicle on which a continuously variable transmission is mounted.

The present disclosure provides a control device for a continuously variable transmission mounted on a vehicle, the control device controlling the continuously variable transmission such that an input rotational speed of the continuously variable transmission coincides with a target input rotational speed. The control device includes: target input rotational speed setting means for setting the target input rotational speed such that a speed ratio of the continuously variable transmission is varied stepwise a plurality of times consecutively to a downshift side in response to an operation to depress a brake pedal by a driver. The target input rotational speed setting means sets the target input rotational speed such that an amount of increase in the input rotational speed along with a downshift becomes smaller as the number of times of execution of downshifts is increased while downshifts in which the speed ratio is varied stepwise are executed consecutively.

By setting the target input rotational speed such that the speed ratio of the continuously variable transmission is varied stepwise a plurality of times consecutively to the downshift side in response to an operation to depress the brake pedal by the driver of the vehicle in this way, it is possible to improve the atmospheric deceleration feel, that is, the rhythmics of deceleration, felt by the driver by rhythmically varying the vehicle stale during deceleration (such as deceleration G and the engine sound, for example). It is considered that the driver's intention to decelerate is gradually reduced even if the brake pedal is depressed, as the vehicle is decelerated and the vehicle speed is lowered in response to an operation to depress the brake pedal by the driver. In the light of this, the control device according to the present disclosure sets the target input rotational speed such that the amount of increase in input rotational speed along with a downshift becomes smaller as the number of times of execution of downshifts is increased while downshifts in which the speed ratio is varied stepwise are executed consecutively. Consequently, it is possible to provide the driver with a large deceleration feel that matches the intention to decelerate by increasing the amount of increase in input rotational speed in the initial stage of braking in which the intention to decelerate of the driver is strong, and to reduce the deceleration feel which is felt by the driver by reducing the amount of increase along with a reduction in intention to decelerate. As a result, it is possible to provide the driver with a sensation that (direct) deceleration that matches his/her operation to depress the brake pedal has been obtained, that is, a sense of directness. Thus, with the control device according to the present disclosure, it is possible to farther improve the deceleration feel and the drivability, during braking, of a vehicle on which a continuously variable transmission is mounted.

DETAILED DESCRIPTION

Now, an embodiment of the present disclosure will be described with reference to the drawings.

Figure 1:
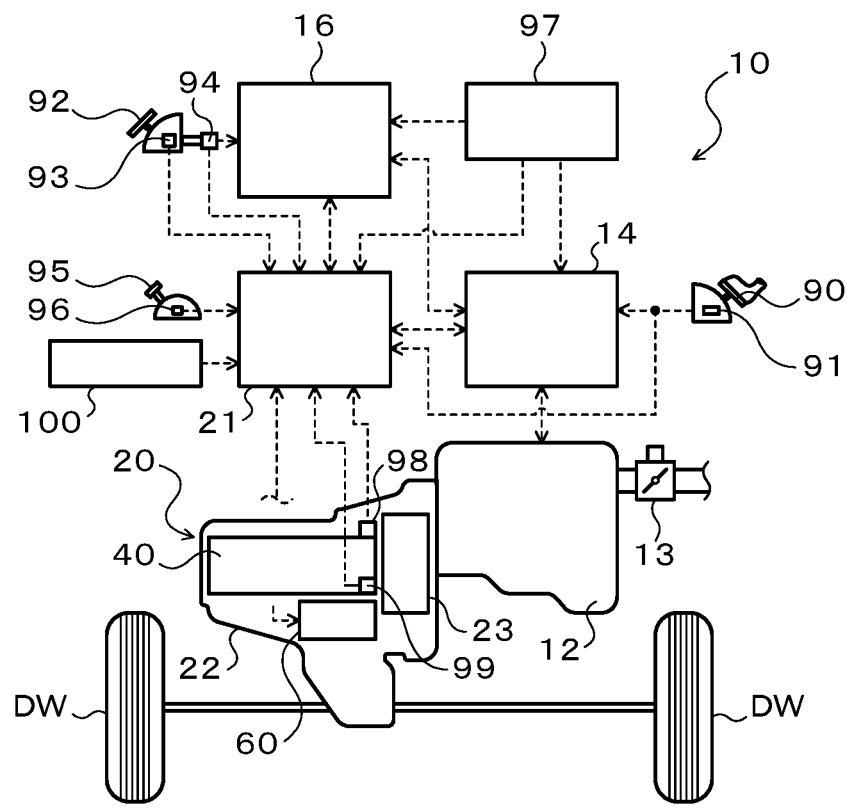
FIG. 1 illustrates a schematic configuration of a vehicle that incorporates a power transfer device that includes a control device for a continuously variable transmission according to the present disclosure.

FIG. 1 illustrates a schematic configuration of an automobile 10 that incorporates a power transfer device 20 that includes a control device for a continuously variable transmission according to the present disclosure. In addition to the power transfer device 20, the automobile 10 illustrated in the drawing includes: an engine (internal combustion engine) 12 that serves as a motor that outputs power through explosive combustion of a mixture of a hydrocarbon fuel, such as gasoline and light oil, and air; an engine electronic control unit, (hereinafter referred to as an "engine ECU") 14 that controls the engine 12; a brake electronic control unit (hereinafter referred to as a "brake ECU") 16 that controls an electronically controlled hydraulic brake unit (not illustrated); and so forth.

The engine ECU 14 is structured as a microcomputer that includes a CPU (not illustrated) as a main component, and has a ROM that stores various programs, a RAM that temporarily stores data, input and output ports and a communication port (not illustrated), and so forth besides the CPU. As illustrated in FIG. 1, the engine ECU 14 receives inputs such as an accelerator operation amount (accelerator depression amount) from an accelerator pedal position sensor 91 that detects the amount of depression (amount of operation) of an accelerator pedal 90, a vehicle speed from a vehicle speed sensor 97, signals from various sensors such as a crankshaft position sensor (not illustrated) that detects the rotational position of the crankshaft, and signals from other electronic control units such as the brake ECU 16. The engine ECU 14 controls an electronically controlled throttle valve 13, a fuel injection valve and an ignition plug (not illustrated), and so forth on the basis of the received signals.

The brake ECU 16 is also structured as a microcomputer that includes a CPU (not illustrated) as a main component, and has a ROM that stores various programs, a RAM that temporarily stores data, input and output ports and a communication port (not illustrated), and so forth besides the CPU. As illustrated in FIG. 1, the brake ECU 16 receives inputs such as a brake switch signal from a brake switch 93 that detects depression of a brake pedal 92 by a driver, a master cylinder pressure Pmc detected by a master cylinder pressure sensor 94 when the brake pedal 92 is depressed, the vehicle speed from the vehicle speed sensor 97, signals from various sensors (not illustrated), and signals from other electronic control units such as the engine ECU 14. The brake ECU 16 controls a brake actuator (hydraulic actuator) (not illustrated) etc. on the basis of the received signals.

Figure 2:
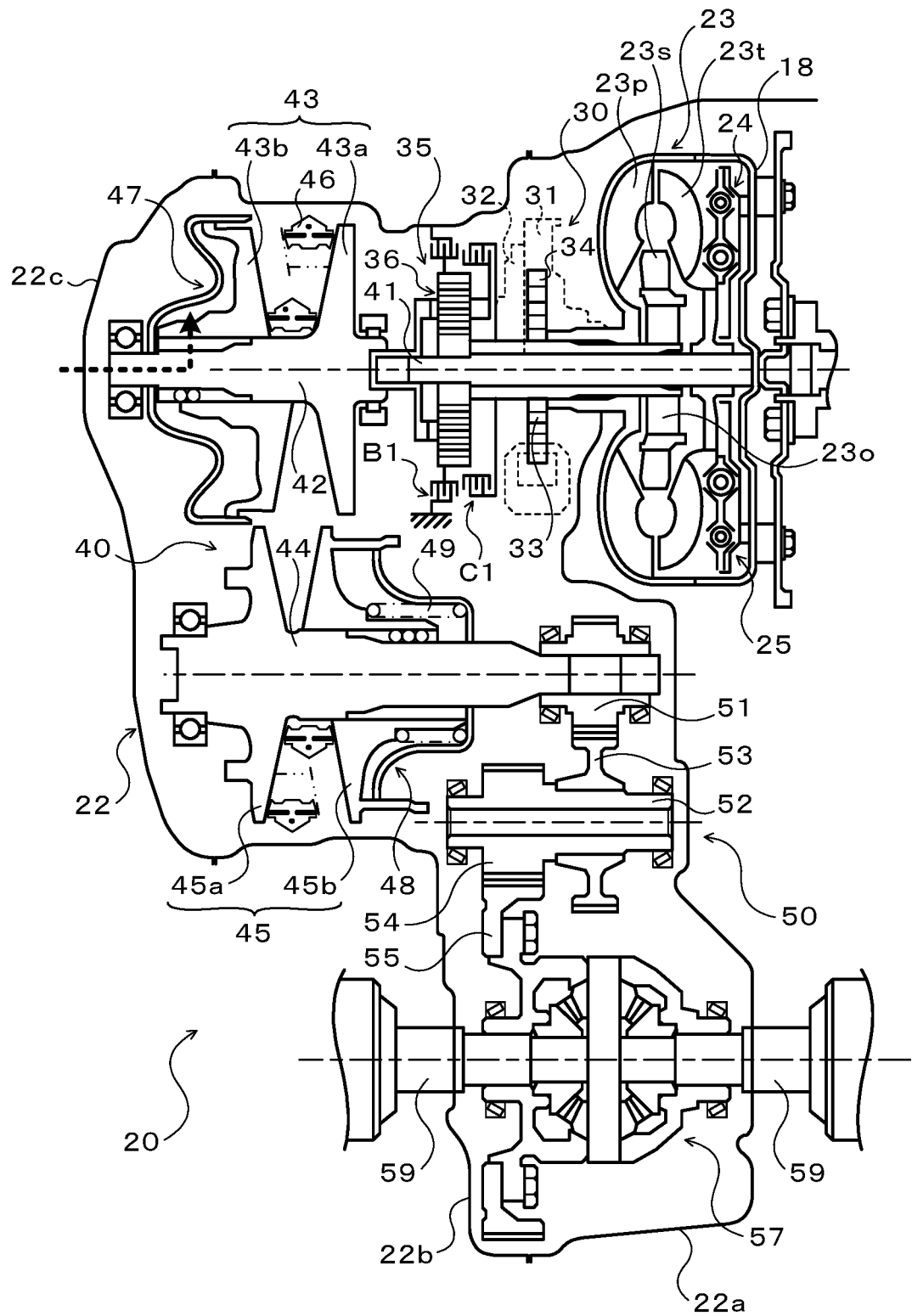
FIG. 2 illustrates a schematic configuration of the power transfer device illustrated in FIG. 1.

FIG. 2 illustrates a schematic configuration of the power transfer device 20 which is mounted on the automobile 10 according to the embodiment. The power transfer device 20 illustrated in the drawing is constituted as a transaxle connected to the engine 12 disposed transversely such that the crankshaft and left and right drive shafts 59, which are connected to drive wheels DW, are generally parallel to each other. As illustrated in the drawing, the power transfer device 20 includes a transmission case 22 composed of a converter housing 22a, a transaxle case 22b, and a rear cover 22c integrally coupled to each other, a starting device 23 housed inside the transmission case 22, an oil pump 30, a forward/reverse switching mechanism 35, a continuously variable transmission (hereinafter referred to as appropriate as a "CVT") 40 of a belt type, a gear mechanism 50, a differential gear (differential mechanism) 57, a hydraulic control device 60 (see FIG. 1), a speed change electronic control unit (hereinafter referred to as a "speed change ECU") 21 that serves as a control device that controls the starting device 23 and the CVT 40, and so forth.

The starting device 23 is constituted as a fluidic starting device with a lock-up clutch, and housed inside the converter housing 22a. As illustrated in FIG. 2, the starting device 23 has a pump impeller 23p connected to the crankshaft of the engine 12 via a front cover 18 that serves as an input member, a turbine runner 23t fixed to an input shaft 41 of the CVT 40, a stator 23s disposed inside the pump impeller 23p and the turbine runner 23t to adjust the flow of working oil (ATF) from the turbine runner 23t to the pump impeller 23p, a one-way clutch 23o that restricts rotation of the stator 23s to one direction, a damper mechanism 24, a lock-up clutch 25, and so forth.

The pump impeller 23p, the turbine runner 23t, and the stator 23s function as a torque converter through the action of the stator 23s when the rotational speed difference between the pump impeller 23p and the turbine runner 23t is large, and function as a fluid coupling when the rotational speed difference between the pump impeller 23p and the turbine runner 23t is small. It should be noted, however, that the starting device 23 may not be provided with the stator 23s and the one-way clutch 23o so that the pump impeller 23p and the turbine runner 23t function only as a fluid coupling. The damper mechanism 24 has an input element coupled to the lock-up clutch 25, an intermediate element coupled to the input element via a. plurality of first elastic members, an output element coupled to the intermediate element via a plurality of second elastic members and fixed to a turbine hub, and so forth, for example. The lock-up clutch 25 selectively establishes and releases lock-up In which the pump impeller 23p and the turbine runner 23t, that is, the front cover 18 and the input shaft 41 of the CVT 40, are mechanically coupled to each other (via the damper mechanism 24). The lock-up clutch 25 may be constituted as a hydraulic single-plate friction clutch, or may be constituted as a hydraulic multi-plate friction clutch.

The oil pump 30 is constituted as a so-called gear pump that has a pump assembly composed of a pump body 31 and a pump cover 32 disposed between the starting device 23 and the forward/reverse switching mechanism 35, an inner rotor (externally toothed gear) 33, an outer rotor (internally toothed gear) 34, and so forth. The pump body 31 and the pump cover 32 are fixed to the converter housing 22a or the transaxle case 22b. In addition, the inner rotor 33 is coupled to the pump impeller 23p via a hub. Thus, when the inner rotor 33 is rotated by power from the engine 12, the oil pump 30 suctions working oil (ATF) in an oil pan (working oil storage portion) (not illustrated) via a strainer (not illustrated), and supplies (discharges) the working oil, the pressure of which has been raised, to the hydraulic control device 60.

The forward/reverse switching mechanism 35 is housed inside the transaxle ease 22b, and has a double-pinion planetary gear mechanism 36, and a brake B1 and a clutch C1 that serve as hydraulic friction engagement elements. The planetary gear mechanism 36 has a sun gear fixed to the input shaft 41 of the CVT 40, a ring gear, and a carrier that supports a pinion gear meshed with the sun gear and a pinion gear meshed with the ring gear and that is coupled to a primary shaft 42 of the CVT 40. The brake B1 disengages the ring gear of the planetary gear mechanism 36 from the transaxle case 22b so as to be rotatable, and makes the ring gear of the planetary gear mechanism 36 unrotatably stationary with respect to the transaxle ease 22b when a hydraulic pressure is supplied from the hydraulic control device 60. Meanwhile, the clutch C1 disengages the carrier of the planetary gear mechanism 36 from the input shaft 41 (sun gear) so as to be rotatable, and couples the carrier of the planetary gear mechanism 36 to the input shaft 41 when a hydraulic pressure is supplied from the hydraulic control device 60. Consequently, by disengaging the brake B1 and engaging the clutch C1, it is possible to transfer power transferred to the input shaft 41 as it is to the primary shaft 42 of the CVT 40 to drive the automobile 10 forward. By engaging the brake B1 and disengaging the clutch C1, meanwhile, it is possible to transfer rotation of the input shaft 41 to the primary shaft 42 of the CVT 40 with the direction of the rotation inverted to drive the automobile 10 rearward. By disengaging the brake B1 and the clutch C1, further, it is possible to release connection between the input shaft 41 and the primary shaft 42.

The CVT 40 has: a primary pulley 43 provided on the primary shaft 42 which serves as a driving rotary shaft; a secondary pulley 45 provided on a secondary shaft 44 that serves as a driven rotary shaft disposed in parallel with the primary shaft 42; a belt 46 that extends between a groove of the primary pulley 43 and a groove of the secondary pulley 45; a primary cylinder 47 which is a hydraulic actuator that changes the width of the groove of the primary pulley 43; and a secondary cylinder 48 which is a hydraulic actuator that changes the width of the groove of the secondary pulley 45. The primary pulley 43 is composed of a fixed sheave 43a formed integrally with the primary shaft 42, and a movable sheave 43b supported so as to be slidable in the axial direction with respect to the primary shaft 42 via a bail spline. Meanwhile, the secondary pulley 45 is composed of a fixed sheave 45a formed integrally with the secondary shaft 44, and a movable sheave 45b supported so as to be slidable in the axial direction with respect to the secondary shaft 44 via a ball spline and urged in the axial direction by a return spring 49 which is a compression spring.

The primary cylinder 47 is formed behind the movable sheave 43b of the primary pulley 43. The secondary cylinder 48 is formed behind the movable sheave 45b of the secondary pulley 45. Working oil is supplied from the hydraulic control device 60 to the primary cylinder 47 and the secondary cylinder 48 in order to vary the widths of the grooves of the primary pulley 43 and the secondary pulley 45. This allows power transferred from the engine 12 to the primary shaft 42 via the starting device 23 and the forward/reverse switching mechanism 35 to be continuously varied in speed and the resultant power is output to the secondary shaft 44. The power output to the secondary shaft 44 is then transferred to the left and right drive wheels DW via the gear mechanism 50, the differential gear 57, and the drive shafts.

The gear mechanism 50 has: a counter drive gear 51 rotatably supported by the transaxle ease 22b via a bearing; a counter shaft 52 that extends in parallel with the secondary shaft 44 and the drive shahs 59 and that is rotatably supported by the transaxle case 22b via a bearing: a counter driven gear 53 fixed to the counter shaft 52 and meshed with the counter drive gear 51; a drive pinion gear (final drive gear) 54 formed (or fixed) on the counter shaft 52; and a differential ring gear (final driven gear) 55 meshed with the drive pinion gear 54 and coupled to the differential gear 57.

The hydraulic control device 60 is connected to the oil pump 30 discussed above, which is driven by power from the engine 12 to suction working oil from the oil pan via a strainer and discharge the working oil. The hydraulic control device 60 regulates a hydraulic pressure from the oil pump 30 to generate a hydraulic pressure required by the starting device 23. the forward/reverse switching mechanism 35, the CVT 40, and so forth, and supplies working oil that serves as a lubrication medium to predetermined portions such as the CVT 40, the one-way clutch 23o, and the forward/reverse switching mechanism 35 and objects to be lubricated such as various hearings. To this end, the hydraulic control device 60 has: a primary regulator valve that regulates the pressure of working oil from the oil pump 30 to generate a line pressure PL that serves as a source pressure for a hydraulic pressure to be supplied to the primary cylinder 47, the secondary cylinder 48, and so forth; a modulator valve that decreases the line pressure PL to generate a constant modulator pressure Pmod; a pressure regulation valve (linear solenoid valve) that regulates the modulator pressure Pmod from the modulator valve to generate a hydraulic pressure for the brake B1 or the clutch C1; and a manual valve that operates in conjunction with a shift lever 95 (see FIG. 1) to supply working oil from the pressure regulation valve to one of the brake B1 and the clutch C1 in accordance with the shift position and block supply of a hydraulic pressure to the brake B1 and the clutch C1.

In order to generate a hydraulic pressure required for shifting of the CVT 40, the hydraulic control device 60 further has a first linear solenoid valve, a second linear solenoid valve, a primary pulley pressure control valve, and a secondary pulley pressure control valve. The first linear solenoid valve regulates the modulator pressure Pmod to generate a primary solenoid pressure Pslp that serves as a signal pressure, for example. The second linear solenoid valve regulates the modulator pressure Pmod to generate a secondary solenoid pressure Psls that serves as a signal pressure, for example. In addition, the primary pulley pressure control valve regulates the line pressure PL using the primary solenoid pressure Pslp from the first linear solenoid valve as a signal pressure to generate a primary pulley pressure (primary sheave pressure) Pp for the primary pulley 43, that is, the primary cylinder 47. The secondary pulley pressure control valve regulates the line pressure PL using the secondary solenoid pressure Psls from the second linear solenoid valve as a signal pressure to generate a secondary pulley pressure (secondary sheave pressure) Ps for the secondary pulley 45, that is, the secondary cylinder 48.

The speed change ECU 21 which controls the power transfer device 20 discussed above is also structured as a microcomputer that includes a CPU (not illustrated) as a main component, and has a ROM that stores various programs, a RAM that temporarily stores data, input and output ports and a communication port (not illustrated), and so forth besides the CPU, As illustrated in FIG. 1, the speed change ECU 21 receives inputs such as signals from various sensors such as the accelerator operation amount from the accelerator pedal position sensor 91, the vehicle speed from the vehicle speed sensor 97, the brake switch signal from the brake switch 93, the master cylinder pressure Pmc which is detected by the master cylinder pressure sensor 94, and the shift position from a shift position sensor 96 that detects the operating position of the shift lever 95 for selecting a desired shift position from a plurality of shift positions, and signals from the engine ECU 14 and the brake ECU 16.

As illustrated in FIG. 1, the speed change ECU 21 also receives inputs such as signals from an input rotational speed sensor 98 that detects an input rotational speed (the rotational speed of the input shaft 41 or the primary shaft 42)

Nin of the CVT 40, an output rotational speed sensor 99 that detects an output rotational speed (the rotational speed of the secondary shaft 44) Nout of the CVT 40, and an oil temperature sensor (not illustrated) that detects an oil temperature Toil of working oil in the hydraulic control device 60. The speed change ECU 21 controls the starting device 23 and the CVT 40, that is, the pressure regulation valves and the first and second linear solenoid valves discussed above and so forth which compose the hydraulic control device 60, on the basis of the input signals discussed above. In controlling such valves, the speed change ECU 21 controls a drive circuit (not illustrated) such that a current that matches a hydraulic pressure command value is applied from an auxiliary battery (not illustrated) to solenoid portions of the valves.

Furthermore, a mode select switch 100 is connected to the speed change ECI 21. The mode select switch 100 allows the driver of the automobile 10 to select a desired control mode from a plurality of control modes of the CVT 40. In the embodiment, the mode select switch 100 is configured to allow the driver to select one of a normal mode (continuously variable speed change mode), in which a speed ratio γ of the CVT 40 is continuously changed in accordance with an operation to depress the accelerator pedal 90 or the brake pedal 92, and a sport mode (stepwise speed change mode), In which the speed ratio γ is changed stepwise in accordance with an operation to depress the accelerator pedal 90 or the brake pedal 92. In the case where the normal mode (continuously variable speed change mode) is selected by the driver via the mode select switch 100, the speed change ECU 21 sets a mode flag Fm to a value of 0. In the case where the sport mode (stepwise speed change mode) is selected by the driver via the mode select switch 100, the speed change ECU 21 sets the mode flag Fm to a value of 1, and has the set value stored in the RAM (not illustrated).

Next, speed change control for the CVT 40 performed when the brake pedal 92 is depressed by the driver of the automobile 10 while the sport mode is selected by the driver will be described.

Figure 3:
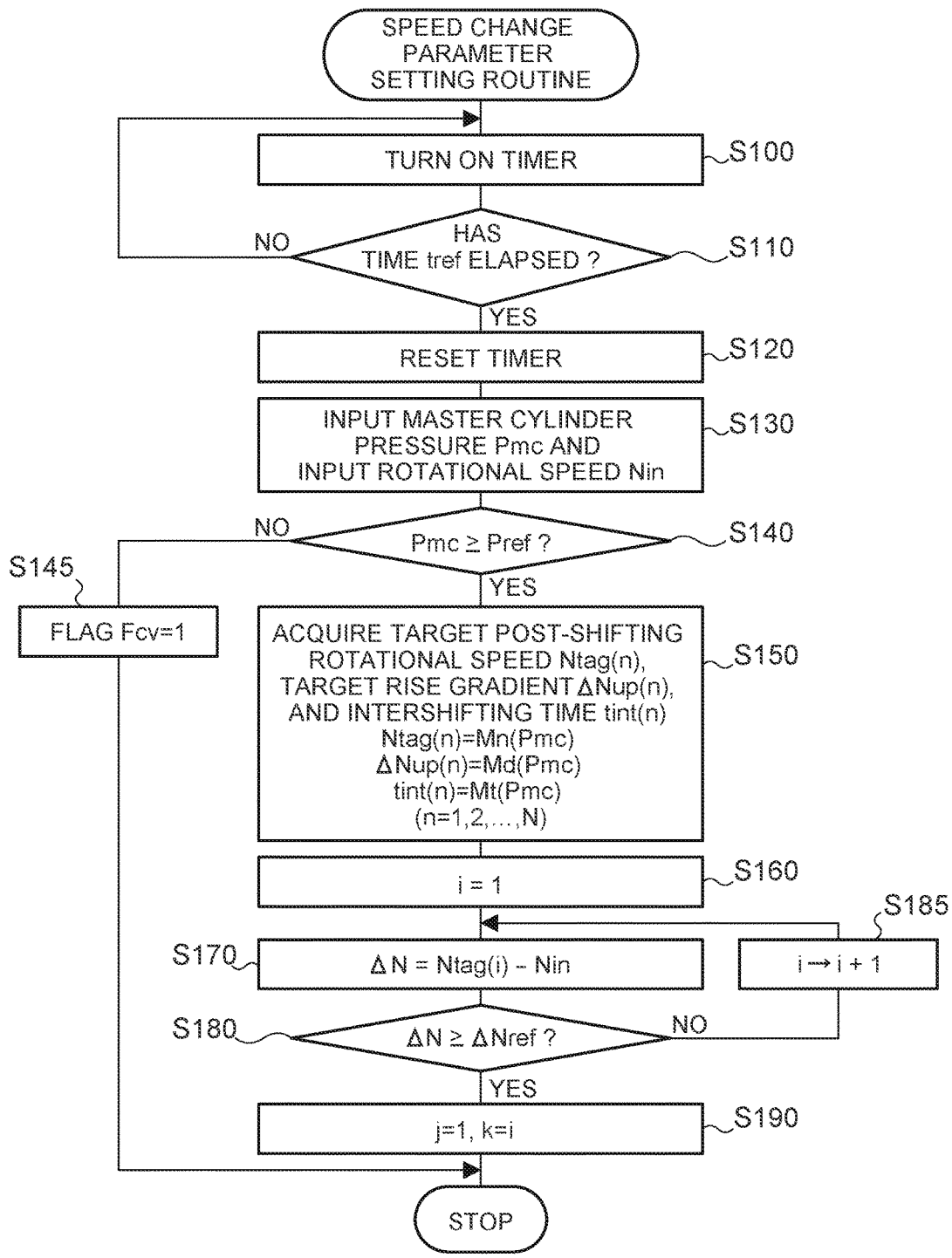
FIG. 3 is a flowchart illustrating an example of a speed change parameter setting routine executed by the control device for a continuously variable transmission according to the present disclosure.

FIG. 3 is a flowchart illustrating an example of a speed change parameter setting routine executed by the speed change ECU 21 when the brake pedal 92 is depressed by the driver of the automobile 10 while the snort mode is selected. As illustrated in the drawing, when it is determined on the basis of the brake switch signal from the brake switch 93 that the brake pedal 92 is depressed by the driver, the speed change ECU 21 (CPU) turns on a timer (not illustrated) (step S100), and determines whether or not a counted time t counted by the timer has reached a time tref (e.g. a time of about 100 to 100 mSec) determined in advance (step S110). If it is determined in step S110 that the counted time t is equal to or more than the time trek the speed change ECU 21 resets the timer (step S120), and receives an input of (acquires) the master cylinder pressure Pmc which is transmitted from the master cylinder pressure sensor 94 as a required braking amount required by the driver when he/she depresses the brake pedal 92 (step S130), In step S130, in addition, the speed change ECU 21 receives an input of the input rotational speed Nin of the CVT 40 which is transmitted from the input rotational speed sensor 98.

Next, the speed change ECU 21 determines whether or not the master cylinder pressure Pmc which is input in step S130 is equal to or more than a threshold Pref (e.g. the master cylinder pressure at the time when the brake pedal stroke is 20 to 30%) determined in advance (step S140). In the case where it is determined that the master cylinder pressure Pmc which is input in step S130 is less than the threshold Pref, the speed change ECU 21 sets a flag Fcv to a value of 1 (step S145), and ends this routine. In the case where the flag Fcv is set to a value of 1, a target Input rotational speed Nin*, which is a target value for the input rotational speed Nin of the CVT 40 (rotational speed Ne of the engine 12), is set using a normal mode speed change map (speed change map for continuously variable speed change control) (not illustrated), and a target speed ratio γ* (=Nin*/Nout) for the CVT 40 is set from the target input rotational speed Nin* and the output rotational speed Nout.

In the case where it is determined that the master cylinder pressure Pmc which is input in step S130 is equal to or more than the threshold Pref (step S140), on the other hand, the speed change ECU 21 acquires a target post-shifting rotational speed Ntag(n), a target rise gradient ΔNup(n), and an intershifting time tint(n) (step S150) for an integer n, from a value of 1 to a value of N (in the embodiment, N=5, for example), that indicates the order (the number of times of execution) of downshifts in which the speed ratio γ of the CVT 40 is varied stepwise to the downshift side in response to depression of the brake pedal 92 on the basis of the master cylinder pressure Pmc which is input in step S130. The target post-shifting rotational speed Ntag(n) is a target value for the input rotational speed after (immediately after) the speed ratio γ is varied stepwise to the downshift side by the n-th downshift during depression of the brake pedal 92. In addition, the target rise gradient ΔNup(n) prescribes a rise gradient (a positive value), per time dt determined in advance, of the input rotational speed Nin during a period since the timing to start the n-th downshift until the input rotational speed Nin reaches the target post-shifting rotational speed Ntag(n). Furthermore, the intershifting time tint(n) is equivalent to the time interval since completion of the n-th downshift until the timing to start the (n+1)-th downshift, that is, the time interval between consecutive downshifts.

Figure 4:
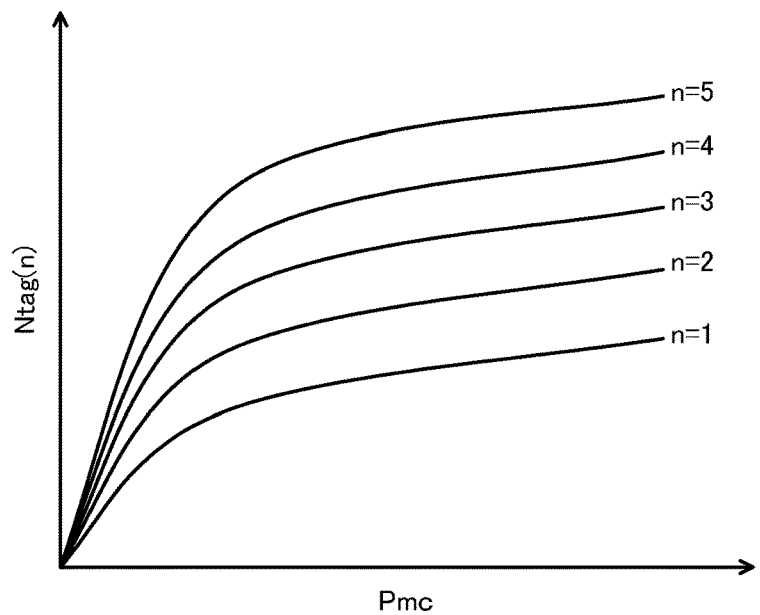
FIG. 4 is a flowchart illustrating an example of a target post-shifting rotational speed map.

In the embodiment, a target post-shifting rotational speed map that prescribes the relationship between the master pressure cylinder Pmc as the required braking amount at the time when the driver depresses the brake pedal 92 and the target post-shifting rotational speed Ntag(n) for each of a plurality of downshifts, from the first to N-th downshifts, is prepared in advance, and stored in the ROM (not illustrated) of the speed change ECU 21. As illustrated in FIG. 4, the target post-shifting rotational speed map is prepared such that the target post-shifting rotational speed Ntag(n) for each downshift is higher as the master cylinder pressure Pmc is higher, and such that the target post-shifting rotational speed Ntag(n) becomes higher as the integer n, that is, the number of times of execution of downshifts, is increased. That is, the target post-shifting rotational speed Ntag(n) corresponding to a certain master cylinder pressure Pmc meets the relationship Ntag(1)<Ntag(2)<Ntag(3)< . . . <Ntag(N). Furthermore, to prepare the target post-shifting rotational speed map, the target post-shifting rotational speed Ntag(n) corresponding to the master cylinder pressure Pmc for each downshift is determined such that the amount of increase in input rotational speed Nin at the time when the speed ratio γ is varied stepwise to the downshift side, that is, an amount of increase S(n) in input rotational speed Nin since the timing to start the n-th downshift until the input rotational speed Nin reaches the target post-shifting rotational speed Ntag(n), becomes smaller as the integer n, that is, the number of times of execution of downshifts, is increased, and such that the amount of increase S(n) is larger as the master cylinder pressure Pmc as the required braking amount is higher.

Figure 5:
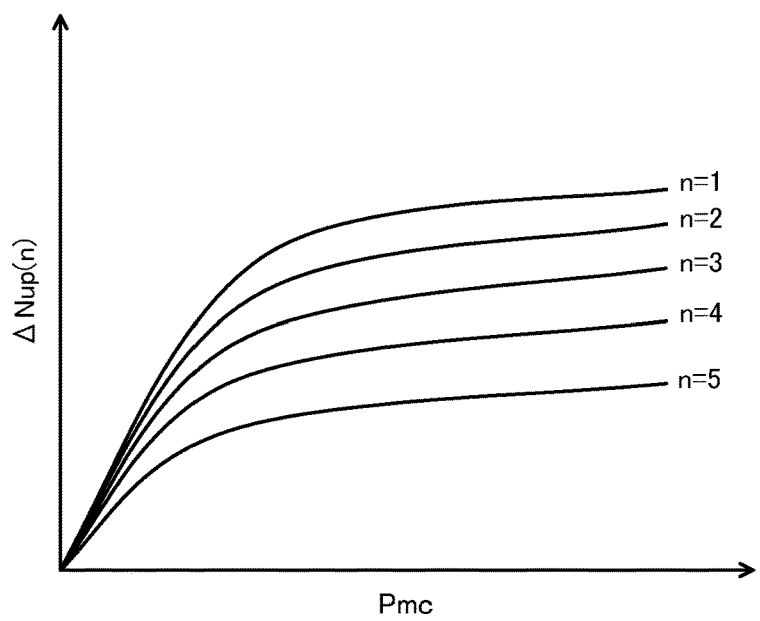
FIG. 5 is a flowchart illustrating an example of a rise gradient map.

In the embodiment, in addition, a rise gradient map that prescribes the relationship between the master pressure cylinder Pmc at the time when the driver depresses the brake pedal 92 and the target rise gradient ΔNup(n) for each of a plurality of downshifts is prepared in advance, and stored in the ROM (not illustrated) of the speed change ECU 21. As illustrated in FIG. 5, the rise gradient map is prepared such that the target rise gradient ΔNup(n) for each downshift is larger as the master cylinder pressure Pmc is higher, and such that the target rise gradient ΔNup(n) becomes smaller as the integer n, that is, the number of times of execution of downshifts, is increased. That is, the target rise gradient ΔNup(n) corresponding to a certain master cylinder pressure Pmc meets the relationship ΔNup(1)>ΔNup(2)>ΔNup(3)> . . . >ΔNup(N).

Figure 6:
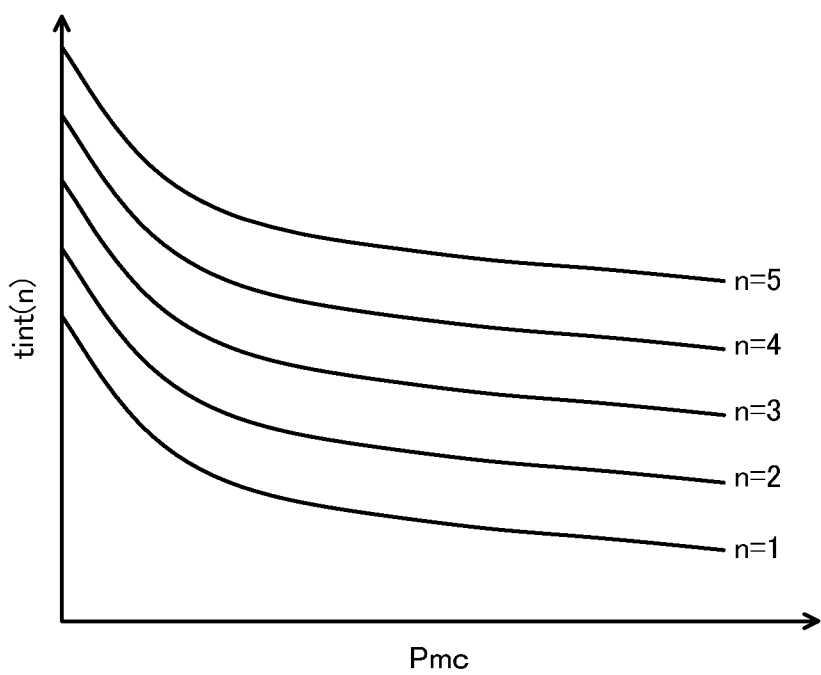
FIG. 6 is a flowchart illustrating an example of an intershifting time map.

In the embodiment, further, an intershifting time map (shifting interval map) that prescribes the relationship between the master pressure cylinder Pmc at the time when the driver depresses the brake pedal 92 and the intershifting time tint(n) for each of a plurality of downshifts is prepared in advance, and stored in the ROM (not illustrated) of the speed change ECU 21. As illustrated in FIG. 6, the intershifting time map is prepared such that the intershifting time tint(n) for each downshift is shorter as the master cylinder pressure Pmc is higher, and such that the intershifting time tint(n) becomes longer as the integer n, that is, the number of times of execution of downshifts, is increased. That is, the intershifting time tint(n) corresponding to a certain master cylinder pressure Pmc meets the relationship tint(1)< tint(2)<tint(3)< . . . <tint(N).

In step S150, the speed change ECU 21 acquires, from the target post-shifting rotational speed map, the target post-shifting rotational speeds Ntag(1), Nag(2), . . . , and Ntag(N) corresponding to the master cylinder pressure Pmc which is input in step S130, and stores the acquired values in the RAM. In step S150, in addition, the speed change ECU 21 acquires, from the target post-shifting rotational speed map, the target rise gradients ΔNup(1), Nag(2), . . . , and Ntag(N) corresponding to the master cylinder pressure Pmc which is input in step S130, and stores the acquired values in the RAM. In step S150, further, the speed change ECU 21 acquires, from the target post-shifting rotational speed map, the intershifting times tint(1), tint(2), . . . , and tint(N) corresponding to the master cylinder pressure Pmc which is input in step S130, and stores the acquired values in the RAM.

After the processing in step S150, the speed change ECU 21 sets a variable i to a value of 1 (step S160), and calculates a difference ΔN (=Ntag(i)−Nin) between the target post-shifting rotational speed Ntag(i) and the input rotational speed Nin which is input in step S130. Furthermore, the speed change ECU 21 determines whether or not the difference ΔN which is calculated in step S170 is equal to or more than a threshold ΔNref (e.g. a value of about 400 to 600 rpm) (step S180). In the ease where it is determined in step S180 that the difference ΔN is less than the threshold ΔNref, the speed change ECU 21 increments the variable i (step S185), and executes the processing in S170 again. In the case where it is determined in step S180 that the difference ΔN is equal to or more than the threshold ΔNref, meanwhile, the speed change ECU 21 sets a variable j to a value of 1, sets a variable k to the variable i (i which meets ΔN=Ntag(i)−Nin≥ΔNref) (step S190), and ends this routine. When this routine is ended, the speed change ECU 21 starts execution of a speed change control routine illustrated in FIG. 7.

Figure 7:
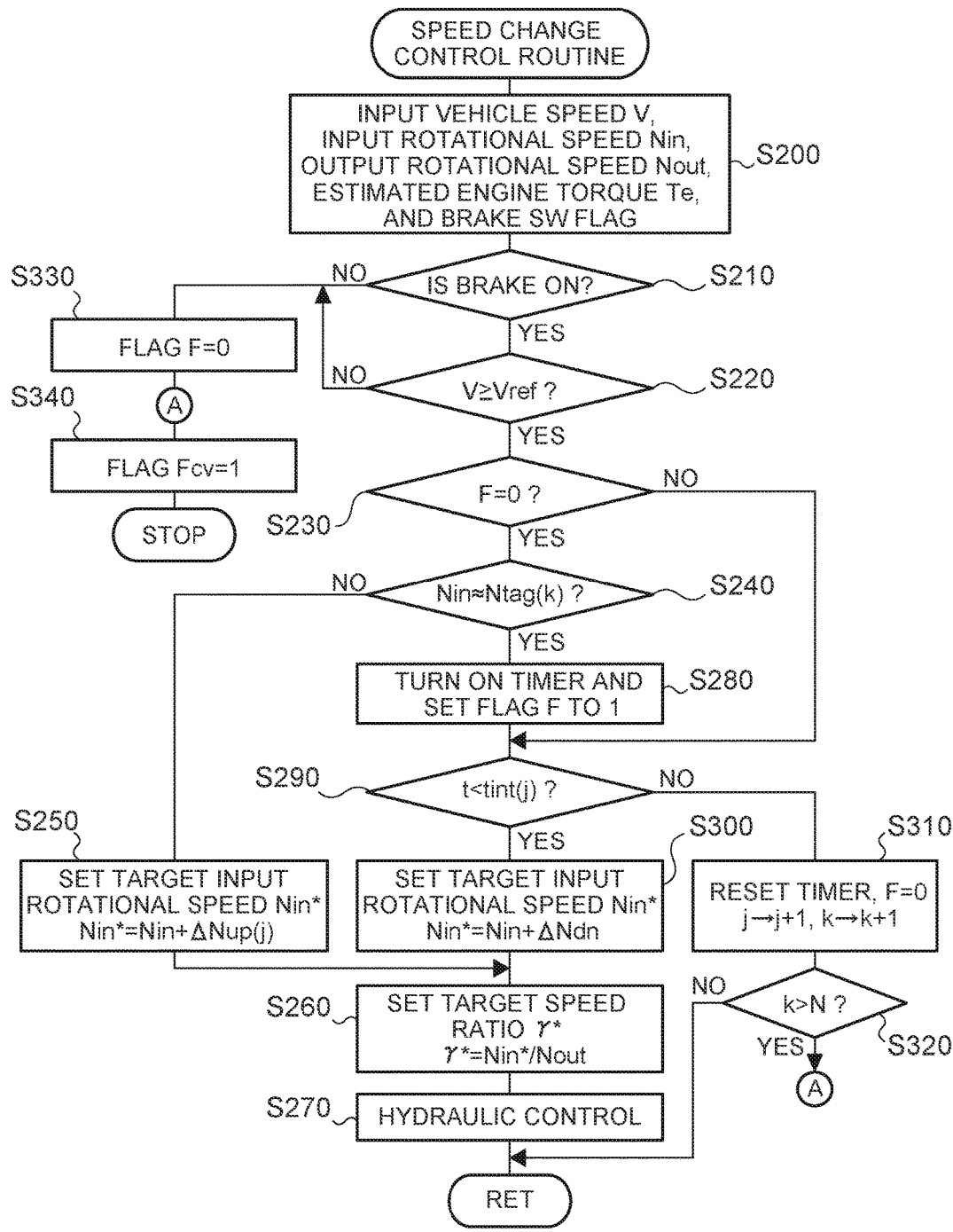
FIG. 7 is a flowchart illustrating an example of a speed change control routine executed by the control device for a continuously variable transmission according to the present disclosure.

After the speed change parameter setting routine of FIG. 3 is ended, the speed change control routine of FIG. 7 is executed repeatedly each time dt (e.g. several milliseconds) by the speed change ECU 21. When the speed change control routine of FIG. 7 is started, the speed change ECU 21 receives data that are necessary for control such as a vehicle speed V transmitted from the vehicle speed sensor 97, the input rotational speed Nin which is transmitted from the input rotational speed sensor 98, the output rotational speed Nout which is transmitted from the output rotational speed sensor 99, estimated engine torque Te transmitted from the engine ECU 14, and the value of a brake switch flag (step S200). The brake switch flag is set to a value of 1 when a signal is output from the brake switch 93, and set to a value of 0 when no signal is output from the brake switch 93.

Next, the speed change ECU 21 determines whether or not depression of the brake pedal 92 has been canceled by the driver on the basis of the value of the brake switch flag which is input in step S200 (step S210). In the case where it is determined in step S210 that depression of the brake pedal 92 has not been canceled by the driver, the speed change ECU 21 determines whether or not the vehicle speed V which is input in step S200 Is equal to or more than a stepwise speed change permitting vehicle speed Vref (e.g. about 20 to 30 km/h) determined in advance (step S220). In the case where it is determined in step S220 that the vehicle speed V is equal to or more than the stepwise speed change permitting vehicle speed Vref the speed change ECU 21 determines whether or not a flag F has a value of 0 (step S230). The flag F is set to a value of 0 when this routine is ended. An affirmative determination is made in step S230 when this routine is started.

In the case where it is determined in step S230 that the flag F has a value of 0, the speed change ECU 21 determines whether or not the input rotational speed Nin which is input in step S200 generally coincides with a target post-shifting rotational speed Ntag(k) (the input rotational speed Nin is included within a relatively narrow range about the target post-shifting rotational speed Ntag(k)) (step S240). In the case where it is determined in step S240 that the input rotational speed Nin does not generally coincide with the target post-shifting rotational speed Ntag(k), the speed change ECU 21 sets the target input rotational speed Nin* to the sum of the input rotational speed Nin which is input in step S200 and a target rise gradient ΔNup(j) acquired and stored in step S150 of the speed change parameter setting routine of FIG. 3 (step S250).

Furthermore, the speed change ECU 21 sets a target speed ratio γ* for the CVT 40 by dividing the set target input rotational speed Nin* by the output rotational speed Nout which is input in step S200 (step S260), and controls the first linear solenoid valve such that the primary pulley pressure Pp from the primary pulley pressure control valve of the hydraulic control device 60 is brought to a value that matches the target speed ratio γ* on the basis of the difference between the input rotational speed Nin which is input in step S200 and the target input rotational speed Nin* etc. (step S270). In step S270, in addition, the speed change ECU 21 controls the second linear solenoid valve on the basis of the estimated engine torque Te etc. such that slip of the belt 46 of the CVT 40 is suppressed by the secondary pulley pressure Ps from the secondary pulley pressure control valve. The speed change ECU 21 then executes the processing in and after step S200 again.

While the processing in and after step S200 is executed and the target input rotational speed Nin* is set in step S250, the input rotational speed Nin of the CVT 40 is raised in accordance with the target rise gradient ΔNup(j). Consequently, the speed ratio γ can he varied stepwise to the downshift side with the input rotational speed Nin of the CVT 40 increased relatively steeply. In addition, in the case where it is determined in step S240 that the input rotational speed Nin of the CVT 40 generally coincides with the target post-shifting rotational speed Ntag(k) after the processing in steps S200 to S230 is executed, the speed change ECU 21 turns on the timer (not illustrated) and sets the flag F to a value of 1 (step S280), and determines whether or not the counted time t counted by the timer is less than an intershifting time tint(j) acquired and stored in step S150 of the speed change parameter setting routine of FIG. 3 (step S290).

If it is determined in step S290 that the counted time t is less than the intershifting time tint(j), the speed change ECU 21 sets the target input rotational speed Nin* to the sum of the input rotational speed Nin which is input in step S200 and a fall gradient ΔNdn (a negative value) which is determined in advance and relative small (step S300). Furthermore, the speed change ECU 21 sets the target speed ratio γ* for the CVT 40 (step S260), and executes hydraulic control on the basis of the target input rotational speed Nin* and the target speed ratio γ* (step S270). Subsequently, the speed change ECU 21 executes the processing in and after step S200 again. The fall gradient ΔNdn which is added to the input rotational speed Nin in step S300 may have a constant value, or may he changed in accordance with the vehicle speed V or the like, for example.

While the processing in and after step S200 is executed and the target input rotational speed Nin* is set in step S300, the input rotational speed Nin of the CVT 40 is lowered in accordance with the fall gradient ΔNdn. If it is determined in step S290 that the counted time t counted by the timer is equal to or more than the intershifting time tint(j) after the processing in steps S200 to S240 and S280 is executed, meanwhile, the speed change ECU 21 resets the timer, sets the flag F to a value of 0, and further increments the variables j and k (step S310). The speed change ECU 21 then determines whether or not the variable k is more than the value N (in the embodiment, N=5, for example) which is the maximum value of the number of times of execution of downshifts (step S320). In the case where the variable k is equal to or less than the value N in step S320, the speed change ECU 21 executes the processing in and after step S200 again.

In the case where it is determined in step S320 that the variable k is more than the value N, in contrast, the speed change ECU 21 sets the flag Fcv discussed above to a value of 1 (step S340), and ends this routine. In the case where it is determined in step S210 that depression of the brake pedal 92 by the driver is canceled, and in the case where it is determined in step S220 that the vehicle speed V is less than the stepwise speed change permitting vehicle speed Vref, the speed change ECU 21 sets the flag F to a value of 0 (step S330), sets the flag Fcv to a value of 1 (step S340), and ends this routine. In the ease where the brake pedal 92 is depressed by the driver after the speed change control routine of FIG. 7 is ended, the target Input rotational speed Nin* is set using a normal mode speed change map (a speed change map for continuously variable speed change control). In the embodiment, however, lower-limit guard processing and gentle variation processing for the target input rotational speed Nin* are executed in order to suppress abrupt variations in input rotational speed Nin.

As a result of execution of the speed change parameter setting routine and the speed change control routine discussed above, when the brake pedal 92 is depressed by the driver while the sport mode is selected, target post-shifting rotational speeds Ntag(1) to Ntag(N) corresponding to the master cylinder pressure Pmc as the required braking amount are acquired for each downshift from the target post-shifting rotational speed map (step S150 of FIG. 3). In step S150, in addition, target rise gradients ΔNup(1) to ΔNup(N) corresponding to the master cylinder Pmc are acquired for each downshift from, the rise gradient map, and intershifting times tint(1) to tint(N), which are intervals between downshifts, corresponding to the master cylinder Pmc are acquired for each downshift from the intershifting time map.

Figure 8:
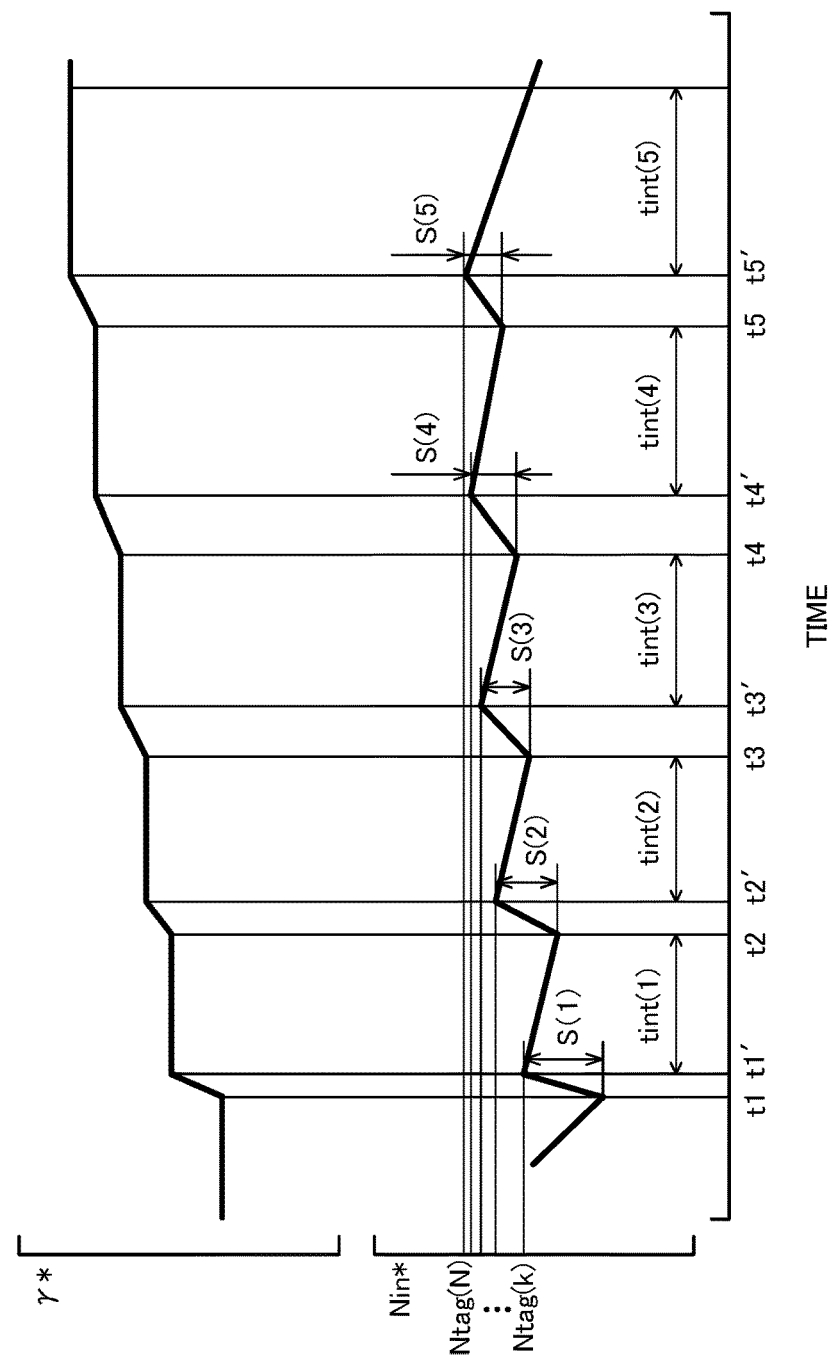
FIG. 8 is a timing chart illustrating an example of how a target input rotational speed and a target shift speed are varied when the speed change control routine of FIG. 7 is executed.

In the ease where the variable k is set to i=1, that is, ΔN=Ntag(1)−Nin≥ΔNref is met, in step S190 of FIG. 3, as illustrated in FIG. 8, the target input rotational speed Nin* is set such that the input rotational speed Nin is raised to the target post-shifting rotational speed Ntag(k)=Ntag(1) corresponding to the first downshift (j=1) at the target rise gradient ΔNup(1) corresponding to the first downshift (step S250 of FIG. 7). When the Input rotational speed Nin generally coincides with the target post-shifting rotational speed Ntag(1) (at time t1' in FIG. 8), the target input rotational speed Nin* is set such that the input rotational speed Nin is lowered at the fall gradient ΔNdn which is determined in advance during a period since time t1' until the intershifting time tint(1) corresponding to the first downshift elapses (step S300), When the intershifting time tint(1) corresponding to the first downshift elapses since the input rotational speed Nin generally coincides with the target post-shifting rotational speed Ntag(1), the timing (time t2 in FIG. 8) to start the second downshift corresponding to the intershifting time tint(1) comes.

When the timing to start the second (j=2) downshift comes, the target input rotational speed Nin* is set such that the input rotational speed Nin is raised to a target post-shifting rotational speed Ntag(k+1)=Ntag(2) corresponding to the second downshift at a target rise gradient ΔNup(2) corresponding to the second downshift (step S250), When the Input rotational speed Nin generally coincides with the target post-shifting rotational speed Ntag(2) (at time t2' in FIG. 8), the target input rotational speed Nin* is set such that the input rotational speed Nin is lowered at the fall gradient ΔNdn which is determined in advance during a period since time t2' until the intershifting time tint(2) corresponding to the second downshift elapses (step S300). When the intershifting time tint(2) corresponding to the second downshift elapses since the input rotational speed Nin generally coincides with the target post-shifting rotational speed Ntag(k+1), the timing (time t3 in FIG. 8) to start, the third downshift corresponding to the intershifting time tint(2) comes.

After that, the target input rotational speed Nin* for the CVT 40 is set such that the input rotational speed Nin is raised to a target post-shifting rotational speed Ntag(k) corresponding to the j-th downshift at a rise gradient corresponding to the j-th downshift and thereafter lowered at the fall gradient ΔNdn until the intershifting time tint(j) elapses until it is determined in steps S210, S220, and S320 of FIG. 7 that the speed change control routine of FIG. 7 should be ended.

Figure 9:
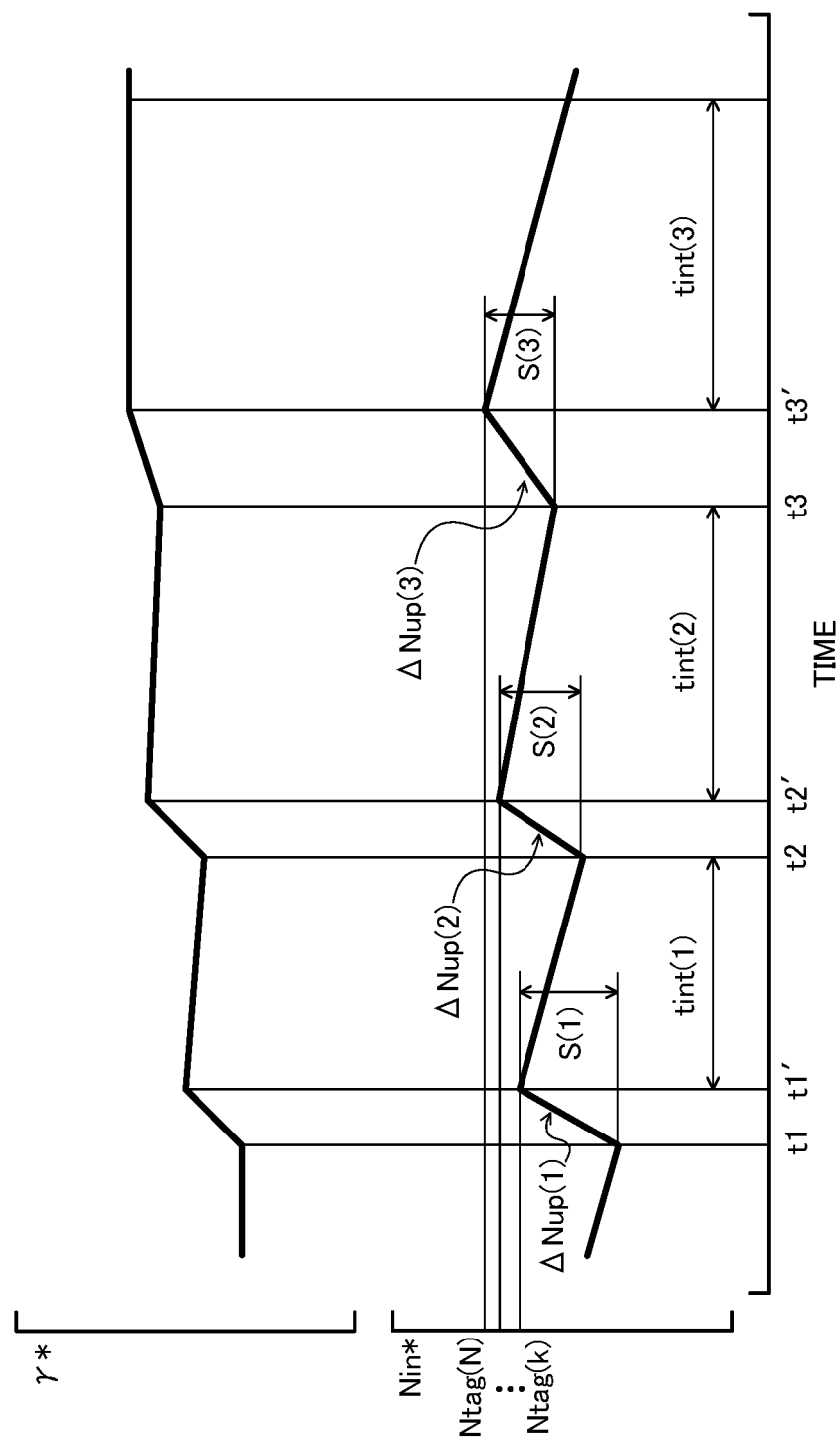
FIG. 9 is a timing chart illustrating another example of how the target input rotational speed and the target shift speed are varied when the speed change control routine of FIG. 7 is executed.

Depending on the input rotational speed Nin at the time when the brake pedal 92 is depressed by the driver, meanwhile, ΔN=Ntag(1)−Nin≥ΔNref or ΔN=Ntag(2)−Nin≥Nref may not be met, and the variable k may be set to i=3, for example, in step S190 of FIG. 3. In this ease, as illustrated in FIG. 9, the target input rotational speed Nin* is set such that the input rotational speed Nin is raised to a target post-shifting rotational speed Ntag(k)=Ntag(3) corresponding to the first (j=1) downshift at a target rise gradient ΔNup(1) corresponding to the first downshift (step S250). When the input rotational speed Nin generally coincides with the target post-shifting rotational speed Ntag(3) (at time t1' in FIG. 9), the target input rotational speed Nin* is set such that the input rotational speed Nin is lowered at the fall gradient ΔNdn which is determined in advance during a period since time t1' until the intershifting time tint(1) corresponding to the first downshift elapses (step S300). When the intershifting time tint(1) corresponding to the first downshift elapses since the input rotational speed Nin generally coincides with the target post-shifting rotational speed Ntag(3), the timing (tune t2 in FIG. 9) to start the second downshift corresponding to the intershifting time tint(1) comes.

When the timing to start the second (j=2) downshift comes, the target input rotational speed Nin* is set such that the input rotational speed Nin is raised to a target post-shifting rotational speed Ntag(k+1)=Ntag(4) corresponding to the second downshift at a target rise gradient ΔNup(2) corresponding to the second downshift (step S250). When the input rotational speed Nin generally coincides with the target post-shifting rotational speed Ntag(4) (at time t2' in FIG. 9), the target input rotational speed Nin* is set such that the input rotational speed Nin is lowered at the fall gradient ΔNdn which is determined in advance during a period since time t2' until the intershifting time tint(2) corresponding to the second downshift elapses (step S300). When the intershifting time tint(2) corresponding to the second downshift elapses since the input rotational speed Nin generally coincides with the target post-shifting rotational speed Ntag(4), the timing (time t3 in FIG. 9) to start the third downshift corresponding to the intershifting time tint(2) comes.

After that, the target input rotational speed Nin* for the CVT 40 is set such that the input rotational speed Nin is raised to a target post-shifting rotational speed Ntag(k) corresponding to the j-th downshift at a rise gradient corresponding to the j-th downshift and thereafter lowered at the fall gradient ΔNdn until the intershifting time tint(j) elapses until it is determined in steps S210, S220, and S320 of FIG. 7 that the speed change control routine of FIG. 7 should be ended.

By setting the target input rotational speed Nin* such that the speed ratio γ of the CVT 40 is varied stepwise a plurality of times consecutively to the downshift side in response to an operation to depress the brake pedal 92 by the driver of the automobile 10 as discussed above, it is possible to improve the atmospheric deceleration feel, that is, the rhythmics of deceleration, felt by the driver by rhythmically varying the vehicle state during deceleration such as deceleration G and the engine sound.

It is considered that the driver's intention to decelerate is gradually reduced, even if the brake pedal 92 is depressed, as the automobile 10 is decelerated and the vehicle speed V is lowered in response to an operation to depress the brake pedal 92 by the driver. In the embodiment, in the light of this, a target post-shifting rotational speed map has been prepared in which the target post-shifting rotational speed Ntag(n) becomes higher as the number (n) of times of execution of downshifts is increased during execution of consecutive downshifts in which the speed ratio γ is varied stepwise and in which the target post-shifting rotational speed Ntag(n) in each downshift is higher as the roaster cylinder pressure Pmc as the required braking amount is higher. Furthermore, the target post-shifting rotational speed map is prepared such that the amount of increase S(n) in input rotational speed Nin since the timing to start the n-th downshift until the input rotational speed Nin reaches the target post-shifting rotational speed Ntag(n) becomes smaller as the number (n) of times of execution of downshifts is increased, and such that, the amount of increase S(n) in each downshift is larger as the master cylinder pressure Pmc as the required braking amount is higher.

The speed change ECU 21 executes the processing in steps S100 to S130 of FIG. 3 to acquire the master cylinder pressure Pmc as the required braking amount required by the driver when he/she depresses the brake pedal 92, and to acquire the target post-shifting rotational speed Ntag(1) to the target post-shifting rotational speed Ntag(N) corresponding to the master cylinder pressure Pmc (step S150 of FIG. 3). Furthermore, the speed change ECU 21 sets the target input rotational speed Nin* such that the amount, of increase S(1), . . . , S(n), . . . , S(N) in input rotational speed Nin at the time when the speed ratio γ is varied stepwise to the downshift side becomes smaller, as illustrated in FIG. 8, as the number (n) of times of execution of downshifts is increased on the basis of the target post-shifting rotational speed Ntag(1) to the target post-shifting rotational speed Ntag(N) (steps S200 to S270). The amount of increase S(n) meets S(n)≈target post-shifting rotational speed Ntag(n)—the input rotational speed Nin at the time when the n-th downshift is started.

Consequently, it is possible to provide the driver with a large deceleration feel that matches the intention to decelerate by increasing the amount of increase S(n) in input rotational speed Nin in the initial stage of braking in which the intention to decelerate of the driver is strong, and to reduce the deceleration feel which is felt by the driver by reducing the amount of increase S(n) along with a reduction in intention to decelerate. As a result, it is possible to provide the driver with a sensation that (direct) deceleration that matches his/her operation to depress the brake pedal 92 has been obtained, that is, a sense of directness. Thus, with the automobile 10 on which the CVT 40 is mounted, it is possible to further improve the deceleration feel and the drivability during braking.

It should be noted, however, that the amount of increase S(1), . . . , S(n), . . . , S(N) in input rotational speed Nin may be constant even if the number (n) of times of execution of downshifts is increased, rather than the target input rotational speed Nin* is set such that the amount of increase S(1), . . . , S(n), . . . , S(N) in input rotational speed Nin at the time when the speed ratio γ is varied stepwise to the downshift side becomes smaller as the number (n) of times of execution of downshifts is increased.

Furthermore, in the case where the difference ΔN between the target post-shifting rotational speed Ntag(1) corresponding to the first downshift which is acquired from the target post-shifting rotational speed map and the input rotational speed Nin at the time when the driver depresses the brake pedal 92 is smaller than the threshold ΔNref, the speed change ECU 21 sets the target input rotational speed using the target post-shifting rotational speeds Ntag(k) to Ntag(N) corresponding to a downshift, the difference ΔN for which is equal to or more than the threshold ΔNref, and the subsequent downshifts (steps S150 to S190 of FIG. 3 and steps S240 and S250 of FIG. 7). Consequently, it is possible to adequately set the target post-shifting rotational speed Ntag(k) in each (in particular, the first) downshift and the maximum number (N−k+1) of times of execution of downshifts in accordance with the master cylinder pressure Pmc as the required braking amount required by the driver and the input rotational speed Nin at the time when the brake pedal 92 is depressed by the driver.

With the processing discussed above executed, the target input rotational speed Nin* is set such that, the amount of increase S(n) in input rotational speed Nin in each downshift is larger as the master cylinder pressure Pmc as the required braking amount is higher in the case where the input rotational speed Nin at the time when the brake pedal 92 is depressed by the driver is the same. That is, it is considered that the driver's intention to decelerate is stronger as the master cylinder pressure Pmc as the required braking amount at the time when the driver depresses the brake pedal 92 is higher, and that the intention to decelerate is reduced gently. Thus, it is possible to provide the driver with an adequate deceleration feel that matches his/her intention to decelerate by setting the target input rotational speed Nin* such that the amount of increase S(n) in input rotational speed Nin in each downshift is larger as the master cylinder pressure Pmc is higher in the case where the input rotational speed Nin at the time when the brake pedal 92 is depressed by the driver is the same.

In the embodiment, further, a rise gradient map in which the target rise gradient ΔNup(n) becomes smaller as the integer n, that is, the number of times of execution of downshifts, is increased. The speed change ECU 21 sets the target input rotational speed Nin* such that the rise gradient of the input rotational speed Nin at the time when the input rotational speed Nin becomes higher from the timing to start a downshift, that is, until the input rotational speed Nin becomes higher by the amount of increase S(n), becomes smaller as the number (n) of times of execution of downshifts is increased on the basis of the target rise gradient ΔNup(n) (steps S150, S240, S250), Consequently it is possible to immediately vary the vehicle state during deceleration such as deceleration G and the engine sound, for example, by making the rise gradient (target rise gradient ΔNup) of the input rotational speed Nin larger in the initial stage of braking in which the driver's intention to decelerate is strong, and to make variations in vehicle state gentler by making the rise gradient (target rise gradient ΔNup) smaller along with a reduction in intention to decelerate. As a result, it is possible to further improve the rhythmics of deceleration. In addition, the rise gradient map according to the embodiment is prepared so as to make the target rise gradient ΔNup(n) in each downshift larger as the master cylinder pressure Pmc as the required braking amount is higher. That is, as discussed above, it is considered that the driver's intention to decelerate is stronger as the master cylinder pressure Pmc (required braking amount) at the time when the driver depresses the brake pedal 92 is higher, and that the intention to decelerate is reduced gently Thus, by setting the target input rotational speed Nin* such that the rise gradient of the input rotational speed Nin in each downshift is larger as the master cylinder pressure Pmc as the required braking amount is higher, it is possible to vary deceleration G, the engine sound during deceleration, or the like further more adequately in accordance with the driver's intention to decelerate.

In the embodiment described above, in addition, an intershifting time map in which the intershifting time tint(n) becomes longer as the integer n, that is, the number of times of execution of downshifts, is increased. The speed change ECU 21 sets the target input rotational speed Nin* such that the time interval between consecutive downshifts becomes longer as the number (n) of times of execution of downshifts is increased on the basis of the intershifting time tint(n) (steps S150, S290, and S300). As discussed above, it is considered that the driver's intention to decelerate Is gradually reduced even if the brake pedal 92 is depressed, as the automobile 10 is decelerated and the vehicle speed V is lowered In response to an operation to depress the brake pedal 92 by the driver. Thus, by making the time interval between consecutive downshifts longer as the number n of times of execution of downshifts is increased when the automobile 10 is decelerating, it is possible to immediately vary the vehicle state such as deceleration G and the engine sound, for example, by making the time interval between consecutive downshifts shorter in the initial stage of braking in which the driver's intention to decelerate is strong, and to make variations in vehicle state gentler by making the time interval between consecutive downshifts longer along with a reduction in intention to decelerate. As a result, it is possible to further improve the rhythmics of deceleration.

Furthermore, the intershifting time map according to the embodiment is prepared such that the intershifting time tint(n) in each downshift is shorter as the master cylinder pressure Pmc as the required braking amount is higher. That is, it is considered that the driver's intention to decelerate is stronger as the master cylinder pressure Pmc (required braking amount) at the time when the driver depresses the brake pedal 92 is higher, and that the intention to decelerate is reduced gently. Thus, by setting the target input rotational speed Nin* such that the time interval between consecutive downshifts is shorter as the required braking amount is larger, it Is possible to vary deceleration G, the engine sound during deceleration, or the like further more adequately in accordance with the driver's intention to decelerate.

By preparing the target post-shifting rotational speed map, the rise gradient map, and the intershifting time map such as those discussed above in advance, in addition, it is possible to set the target input rotational speed Nin* easily and adequately when the speed ratio γ of the CVT 40 is varied stepwise a plurality of times to the downshift side in response to an operation to depress the brake pedal 92 by the driver. It should be noted, however, that a target increase amount map may be prepared in place of the target post-shifting rotational speed map. In the target increase amount map, the amount of increase S(n) in input rotational speed Nin since the timing to start the n-th downshift until the input rotational speed Nin reaches the target post-shifting rotational speed Ntag(n) becomes smaller as the number (n) of times of execution of downshifts is increased, and the amount of increase S(n) in each downshift is larger as the master cylinder pressure Pmc as the required braking amount is higher. In this case, the determination process in step S240 of FIG. 7 may be performed on the basis of the input rotational speed Nin at the time when the driver depresses the brake pedal which is input in step S130 of FIG. 3 and the amount of increase S(n) which is acquired from the target increase amount map.

Furthermore, the mode select switch 100 is connected to the speed change ECU 21. The mode select switch 100 allows the driver to select one of the normal mode (continuously variable speed change mode) and the sport mode (stepwise speed change mode), in which the speed ratio γ is changed stepwise in response to an operation to depress the accelerator pedal 90 or the brake pedal 92. The speed change ECU 21 changes the speed ratio γ stepwise when the sport mode is selected. Consequently, it is possible to improve the drivability of the automobile 10 by changing the speed ratio γ stepwise in the sport mode, and to improve the fuel efficiency of the automobile 10 by continuously changing the speed ratio γ in the normal mode.

The CVT 40 is not limited to the continuously variable transmission of a belt type, and may also be a mechanical continuously variable transmission such as a continuously variable transmission of a toroidal type and a continuously variable transmission of a cone type, for example. Alternatively, the CVT 40 may be an electric continuously variable transmission that includes at least one electric motor (motor generator), or an electric continuously variable transmission that includes a planetary gear and two electric motors (motor generators), in such a case, the rotational speed of the engine or the like may he used in place of the input rotational speed Nin, and a target engine rotational speed may he used in place of the target input rotational speed Nin*. Moreover, in step S130 of FIG. 3, for example, a pedal stroke (amount of depression) of the brake pedal 92 detected by a stroke sensor or a pedal depression force calculated on the basis of the pedal stroke may be acquired as the required braking amount required by the driver when he/she depresses the brake pedal 92.

As described above, the present disclosure provides a control device (21) for a continuously variable transmission mounted on a vehicle (10), the control device (21) controlling the continuously variable transmission (40) such that an input rotational speed (Nin) input to the continuously variable transmission (40) coincides with a target input rotational speed (Nin*). The control device (21) includes target input rotational speed setting means (21, S240, S250) for setting the target input rotational speed (Nin*) such that a speed ratio ($\gamma$) of the continuously variable transmission (40) is varied stepwise a plurality of times consecutively to a downshift side in response to an operation to depress a brake pedal (92) by a driver. The target input rotational speed setting means sets the target input rotational speed (Nin*) such that an amount of increase (S(n)) in the input rotational speed (Nin) along with a downshift becomes smaller as the number (n) of times of execution of downshifts is increased while downshifts in which the speed ratio ($\gamma$) is varied stepwise are executed consecutively.

By setting the target input rotational speed such that the speed ratio of the continuously variable transmission is varied stepwise a plurality of times consecutively to the downshift side in response to an operation to depress the brake pedal by the driver of the vehicle in this way, it is possible to improve the atmospheric deceleration tech that is, the rhythmics of deceleration, felt by the driver by rhythmically varying the vehicle state during deceleration (such as deceleration G and the engine sound, for example). It is considered that the driver's intention to decelerate is gradually reduced even if the brake pedal is depressed, as the vehicle is decelerated and the vehicle speed is lowered in response to an operation to depress the brake pedal by the driven. In the light of this, the control device according to the present disclosure sets the target input rotational speed such that the amount of increase in input rotational speed along with a downshift becomes smaller as the number of times of execution of downshifts is increased while downshifts in which the speed ratio is varied stepwise are executed consecutively. Consequently; it is possible to provide the driver with a large deceleration feel that matches the intention to decelerate by increasing the amount of increase in input rotational speed in the initial stage of braking in which the intention to decelerate of the driver is strong, and to reduce the deceleration feel which is felt by the driver by reducing the amount of increase along with a reduction in intention to decelerate. As a result, it is possible to provide the driver with a sensation that (direct) deceleration that matches his/her operation to depress the brake pedal has been obtained, that is, a sense of directness. Thus, with the control device according to the present disclosure, it is possible to further improve the deceleration feel and the drivability, during braking, of a vehicle on which a continuously variable transmission is mounted.

The control device (21) may further include required braking amount acquisition means (S100 to S130) tor acquiring a required braking amount (Pmc) required by the driver when he/she depresses the brake pedal (92), and the target input rotational speed setting means (21, S150 to S190, S240, S250) may set the target input rotational speed (Nin(*)) such that the amount of increase (S(n)) in the input rotational speed (Nin) in each downshift is larger as the required braking amount (Pmc) is larger in the case where the input rotational speed (Nin) at a time when the brake pedal (92) is depressed by the driver is the same.

That is, it is considered that the driver's intention to decelerate is stronger as the required braking amount at the time when the driver depresses the brake pedal is higher, and that the intention to decelerate is reduced gently. Thus, it is possible to provide the driver with a more adequate deceleration feel that matches his/her intention to decelerate by setting the target input rotational speed such that the amount of increase in input rotational speed in each downshift is larger as the required braking amount is larger in the case where the input rotational speed at the time when the brake pedal is depressed by the driver is the same.

The control device (21) may have a target post-shifting rotational speed map that prescribes, for each of a plurality of downshifts, a relationship between the required braking amount (Pmc) and a target post-shifting rotational speed (Ntag(n)) which is a target value for the input rotational speed (Nin) after the speed ratio ($\gamma$) is varied stepwise to the downshift side; and the target input rotational speed setting means (21, S150, S240, S250) may acquire the target post-shifting rotational speed (Ntag(n)) corresponding to the required braking amount (Pmc) for each downshift from the target post-shifting rotational speed map when the brake pedal (92) is depressed by the driver, and set the target, input rotational speed (Nin(*)) such that the input rotational speed (Nin) is brought to the target post-shifting rotational speed (Ntag(n)) corresponding to the downshift when a timing to start the downshift comes.

In this way, the target post-shifting rotational speed corresponding to the required braking amount may be determined for each downshift such that the amount of increase in input rotational speed along with the downshift becomes smaller as the number of times of execution of downshifts is increased. Consequently, it is possible to set the target input rotational speed easily and adequately when the speed ratio of the continuously variable transmission is varied stepwise a plurality of times to the downshift side in response to an operation to depress the brake pedal.

The target post-shifting rotational speed map may be prepared such that the target post-shifting rotational speed (Ntag(n)) becomes higher as the number (n) of times of execution of downshifts is increased, and such that the target post-shifting rotational speed (Ntag(n)) in each downshift is higher as the required braking amount (Pmc) is larger; and in the case where a difference ($\Delta N$) between the target post-shifting rotational speed (Ntag(1)) corresponding to a first downshift and the input rotational speed (Nin) at a time when the driver depresses the brake pedal (92) is smaller than a predetermined value ($\Delta$Nref), the target input rotational speed setting means (21, S150 to S190, S240, S250) may set the target input rotational speed (Nin*) using the target post-shifting rotational speed (Ntag(k), Ntag (k+1), . . . ) corresponding to a downshift, the difference (ΔN) for which is equal to or more than the predetermined value (ΔNref), and subsequent downshifts.

Consequently, it is possible to adequately set the amount of increase in input rotational speed in each (in particular, the first) downshift and the maximum number of times of execution of downshifts in accordance with the required braking amount required by the driver and the input rotational speed at the time when the brake pedal is depressed by the driver.

The target input rotational speed setting means (21, S150, S240, S250) may set the target input rotational speed (Nin*) such that a rise gradient of the input rotational speed (Nin) from a timing to start a downshift until the input rotational speed (Nin) becomes higher by the amount of increase (S(n)) becomes smaller as the number (n) of times of execution of downshifts is increased.

Consequently, it is possible to immediately vary the vehicle state (such as deceleration G and the engine sound, for example) by making the rise gradient of the input rotational speed larger in the initial stage of braking in which the driver's intention to decelerate is strong, and to make variations in vehicle state gender by making the rise gradient smaller along with a reduction in intention to decelerate. As a result it is possible to further improve the rhythmics of deceleration.

The target input rotational speed setting means (21, S150, S240, S250) may set the target input rotational speed (Nin*) such that the rise gradient in each downshift is larger as the required braking amount (Pmc) required by the driver when he/she depresses the brake pedal (92) is larger.

As discussed above, it is considered that the driver's intention to decelerate is stronger as the required braking amount at the time when the driver depresses the brake pedal is higher, and that the intention to decelerate is reduced gently. Thus, by setting the target input rotational speed such that the rise gradient in each downshift is larger as the required braking amount is larger, it is possible to vary the vehicle state during deceleration further more adequately in accordance with the driver's intention to decelerate.

The target input rotational speed setting means (21, S150, S240 to S320) may set the target input rotational speed (Nin*) such that an interval between consecutive downshifts becomes longer as the number (n) of times of execution of downshifts is increased.

As discussed above, it is considered that the driver's intention to decelerate is gradually reduced even if the brake pedal is depressed, as the vehicle is decelerated and the vehicle speed is lowered in response to an operation to depress the brake pedal by the driver. Thus, by making the interval between consecutive downshifts longer as the number of times of execution of downshifts in which the speed ratio is varied stepwise is increased when the vehicle is decelerating, it is possible to immediately vary the vehicle state (such as deceleration G and the engine sound, for example) by making the interval between consecutive downshifts shorter in the initial stage of braking in which the driver's intention to decelerate is strong, and to make variations in vehicle state gentler by making the interval between consecutive downshifts longer along with a reduction in intention to decelerate. As a result, it is possible to further improve the rhythmics of deceleration.

The target input rotational speed setting means (21, S150, S240 to S320) may set the target input rotational speed (Nin*) such that the interval between the consecutive downshifts is shorter as the required braking amount (Pmc) required by the driver when he/she depresses the brake pedal (92) is larger.

As discussed above, it is considered that the driver's intention to decelerate is stronger as the required braking amount at the time when the driver depresses the brake pedal is higher, and that the intention to decelerate is reduced gently. Thus, by setting the target input rotational speed such that the interval between consecutive downshifts is shorter as the required braking amount is larger, it is possible to vary the vehicle state during deceleration further more adequately in accordance with the driver's intention to decelerate.

The control device (21) may further Include a mode select switch (100) that allows a driver to select one of a continuously variable speed change mode, in which the speed ratio ($\gamma$) is changed continuously, and a stepwise speed change mode, in which the speed ratio ($\gamma$) is changed stepwise at least in response to an operation to depress the brake pedal (92).

Consequently, it is possible to improve the drivability of the vehicle by changing the speed ratio stepwise in the sport mode, and to improve the fuel efficiency of the vehicle by continuously changing the speed ratio of the continuously variable transmission in the normal mode.

The present disclosure also provides a control method for a continuously variable transmission mounted on a vehicle (10), in which the continuously variable transmission (40) is controlled such that an input rotational speed (Nin) of the continuously variable transmission (40) coincides with a target input rotational speed (Nin*). The control method includes: a step (S240, S250) of setting the target input rotational speed (Nin*) such that a speed ratio ($\gamma$) of the continuously variable transmission (40) is varied stepwise a plurality of times consecutively to a downshift side in response to an operation to depress a brake pedal (92) by a driver. The target input rotational speed (Nin*) is set such that an amount of increase (S(n)) in the input rotational speed (Nin) along with a downshift becomes smaller as the number (n) of times of execution of downshifts is increased while downshifts in which the speed ratio ($\gamma$) is varied stepwise are executed consecutively.

With the method for a continuously variable transmission according to the present disclosure, it is possible to improve the atmospheric deceleration feel, that is, the rhythmics, felt by the driver by more rhythmically varying the vehicle state during deceleration (such as deceleration G and the engine sound, for example). Furthermore, it is possible to provide the driver with a sensation that (direct) deceleration that matches his/her operation to depress the brake pedal has been obtained, that is, a sense of directness. Thus, with the method according to the present disclosure, it is possible to further improve the deceleration feel and the drivability, during braking, of a vehicle on which a continuously variable transmission is mounted.

The invention according to the present disclosure is not limited to the embodiment described above in any way, and it is a matter of course that the invention may be modified in various ways without departing from the range of the extension of the present disclosure. Furthermore, the embodiment described above is merely a specific form of the invention described in the "SUMMARY" section, and does not limit the elements of the invention described in the "SUMMARY" section.

INDUSTRIAL APPLICABILITY

The invention according to the present disclosure is applicable to the continuously variable transmission manufacturing industry etc.

The invention claimed is:

1. A control device for a continuously variable transmission mounted on a vehicle, the control device controlling the continuously variable transmission such that an input rotational speed of the continuously variable transmission coincides with a target input rotational speed, the control device comprising:
an electronic control unit that:
sets the target input rotational speed such that a speed ratio of the continuously variable transmission is varied stepwise a plurality of times consecutively to a downshift side in response to an operation to depress a brake pedal by a driver, and
sets the target input rotational speed such that an amount of increase in the input rotational speed along with a downshift becomes smaller as the number of times of execution of downshifts is increased while downshifts in which the speed ratio is varied stepwise are executed consecutively.

2. The control device for a continuously variable transmission according to claim 1, wherein the electronic control unit acquires a required braking amount required by the driver when he/she depresses the brake pedal, and
sets the target input rotational speed such that the amount of increase in the input rotational speed in each downshift is larger as the required braking amount is larger in the case where the input rotational speed at a time when the brake pedal is depressed by the driver is the same.

3. The control device for a continuously variable transmission according to claim 1, wherein
the electronic control unit sets the target input rotational speed such that a rise gradient of the input rotational speed from a timing to start the downshift until the input rotational speed becomes higher by the amount of increase becomes smaller as the number of times of execution of downshifts is increased.

4. The control device for a continuously variable transmission according to claim 1, wherein
the electronic control unit sets the target input rotational speed such that an interval between consecutive downshifts becomes longer as the number of times of execution of downshifts is increased.

5. The control device for a continuously variable transmission according to claim 1, further comprising:
a mode select switch that allows a driver to select one of a continuously variable speed change mode, in which the speed ratio is changed continuously, and a stepwise speed change mode, in which the speed ratio is changed stepwise at least in response to an operation to depress the brake pedal.

6. The control device for a continuously variable transmission according to claim 2, wherein:
the control device has a target post-shifting rotational speed map that prescribes, for each of a plurality of downshifts, a relationship between the required braking amount and a target post-shifting rotational speed which is a target value for the input rotational speed after the speed ratio is varied stepwise to the downshift side; and
the electronic control unit acquires the target post-shifting rotational speed corresponding to the required braking amount for each downshift from the target post-shifting rotational speed map when the brake pedal is depressed by the driver, and sets the target input rotational speed such that the input rotational speed is brought to the target post-shifting rotational speed corresponding to the downshift when a timing to start the downshift comes.

7. The control device for a continuously variable transmission according to claim 2, wherein
the electronic control unit sets the target input rotational speed such that a rise gradient of the input rotational speed from a timing to start the downshift until the input rotational speed becomes higher by the amount of increase becomes smaller as the number of times of execution of downshifts is increased.

8. The control device for a continuously variable transmission according to claim 2, wherein
the electronic control unit sets the target input rotational speed such that an interval between consecutive downshifts becomes longer as the number of times of execution of downshifts is increased.

9. The control device for a continuously variable transmission according to claim 2, further comprising:
a mode select switch that allows a driver to select one of a continuously variable speed change mode, in which the speed ratio is changed continuously, and a stepwise speed change mode, in which the speed ratio is changed stepwise at least in response to an operation to depress the brake pedal.

10. The control device for a continuously variable transmission according to claim 3, wherein
the electronic control unit sets the target input rotational speed such that the rise gradient in each downshift is larger as a required braking amount required by the driver when he/she depresses the brake pedal is larger.

11. The control device for a continuously variable transmission according to claim 3, wherein
the electronic control unit sets the target input rotational speed such that an interval between consecutive downshifts becomes longer as the number of times of execution of downshifts is increased.

12. The control device for a continuously variable transmission according to claim 3, further comprising:
a mode select switch that allows a driver to select one of a continuously variable speed change mode, in which the speed ratio is changed continuously, and a stepwise speed change mode, in which the speed ratio is changed stepwise at least in response to an operation to depress the brake pedal.

13. The control device for a continuously variable transmission according to claim 4, wherein
the electronic control unit sets the target input rotational speed such that the interval between the consecutive downshifts is shorter as a required braking amount required by the driver when he/she depresses the brake pedal is larger.

14. The control device for a continuously variable transmission according to claim 6, wherein:
the target post-shifting rotational speed map is prepared such that the target post-shifting rotational speed becomes higher as the number of times of execution of downshifts is increased, and such that the target post-shifting rotational speed in each downshift is higher as the required braking amount is larger; and
in the case where a difference between the target post-shifting rotational speed corresponding to a first downshift and the input rotational speed at a time when the driver depresses the brake pedal is smaller than a predetermined value, the electronic control unit sets the target input rotational speed using the target post-shifting rotational speed corresponding to the downshift, the difference for which is equal to or more than the predetermined value, and subsequent downshifts.

15. The control device for a continuously variable transmission according to claim 14, wherein
the electronic control unit sets the target input rotational speed such that a rise gradient of the input rotational speed from a timing to start the downshift until the input rotational speed becomes higher by the amount of increase becomes smaller as the number of times of execution of downshifts is increased.

16. The control device for a continuously variable transmission according to claim 15, wherein
the electronic control unit sets the target input rotational speed such that the rise gradient in each downshift is larger as the required braking amount required by the driver when he/she depresses the brake pedal is larger.

17. The control device for a continuously variable transmission according to claim 16, wherein
the electronic control unit sets the target input rotational speed such that an interval between consecutive downshifts becomes longer as the number of times of execution of downshifts is increased.

18. The control device for a continuously variable transmission according to claim 17, wherein
the electronic control unit sets the target input rotational speed such that the interval between the consecutive downshifts is shorter as the required braking amount required by the driver when he/she depresses the brake pedal is larger.

19. The control device for a continuously variable transmission according to claim 18, further comprising:
a mode select switch that allows a driver to select one of a continuously variable speed change mode, in which the speed ratio is changed continuously, and a stepwise speed change mode, in which the speed ratio is changed stepwise at least in response to an operation to depress the brake pedal.

20. A control method for a continuously variable transmission mounted on a vehicle, in which the continuously variable transmission is controlled such that an input rotational speed of the continuously variable transmission coincides with a target input rotational speed, the control method comprising:
setting the target input rotational speed such that a speed ratio of the continuously variable transmission is varied stepwise a plurality of times consecutively to a downshift side in response to an operation to depress a brake pedal by a driver, and
setting the target input rotational speed such that an amount of increase in the input rotational speed along with a downshift becomes smaller as the number of times of execution of downshifts is increased while downshifts in which the speed ratio is varied stepwise are executed consecutively.

* * * * *